(12) United States Patent
Schohn et al.

(10) Patent No.: US 7,999,788 B2
(45) Date of Patent: Aug. 16, 2011

(54) TELEVISION INTERFACING

(75) Inventors: Gregory C. Schohn, Brooklyn, NY (US); Adam Berger, Pittsburgh, PA (US)

(73) Assignee: Penthera Partners, Inc., Pittsburgh, PA (US)

( * ) Notice: Subject to any disclaimer, the term of this patent is extended or adjusted under 35 U.S.C. 154(b) by 774 days.

(21) Appl. No.: 11/404,264

(22) Filed: Apr. 12, 2006

(65) Prior Publication Data

US 2008/0049142 A1 Feb. 28, 2008

(51) Int. Cl.
*H04N 5/50* (2006.01)
(52) U.S. Cl. ........................................ 345/156; 455/566
(58) Field of Classification Search ........... 345/156–172
See application file for complete search history.

(56) References Cited

U.S. PATENT DOCUMENTS

| | | | |
|---|---|---|---|
| 2003/0040341 A1* | 2/2003 | Casais | 455/566 |
| 2005/0197763 A1* | 9/2005 | Robbins et al. | 701/200 |
| 2006/0246955 A1* | 11/2006 | Nirhamo et al. | 455/566 |
| 2007/0078732 A1* | 4/2007 | Crolley et al. | 705/27 |

FOREIGN PATENT DOCUMENTS

WO  WO2007/121130  10/2007

OTHER PUBLICATIONS

PCT International Search Report, PCT Appln. No. PCT/US07/66214, Sep. 9, 2008, 3 pages.
International Preliminary Report on Patentability for corresponding PCT application No. PCT/US2007/066214 mailed Apr. 26, 2006 (5 pages).

* cited by examiner

*Primary Examiner* — Amare Mengistu
*Assistant Examiner* — Jennifer Zubajlo
(74) *Attorney, Agent, or Firm* — Fish & Richardson P.C.

(57) ABSTRACT

Among other things, on a wireless handheld device that has a display and keys, an interface is provided that enables a user to control aspects of presentation of video material on a display of the handheld device, the interface including presentation on the display of visible tokens that are associated with respective keys.

46 Claims, 15 Drawing Sheets

TELEVISION INTERFACING

BACKGROUND

Figure 1:
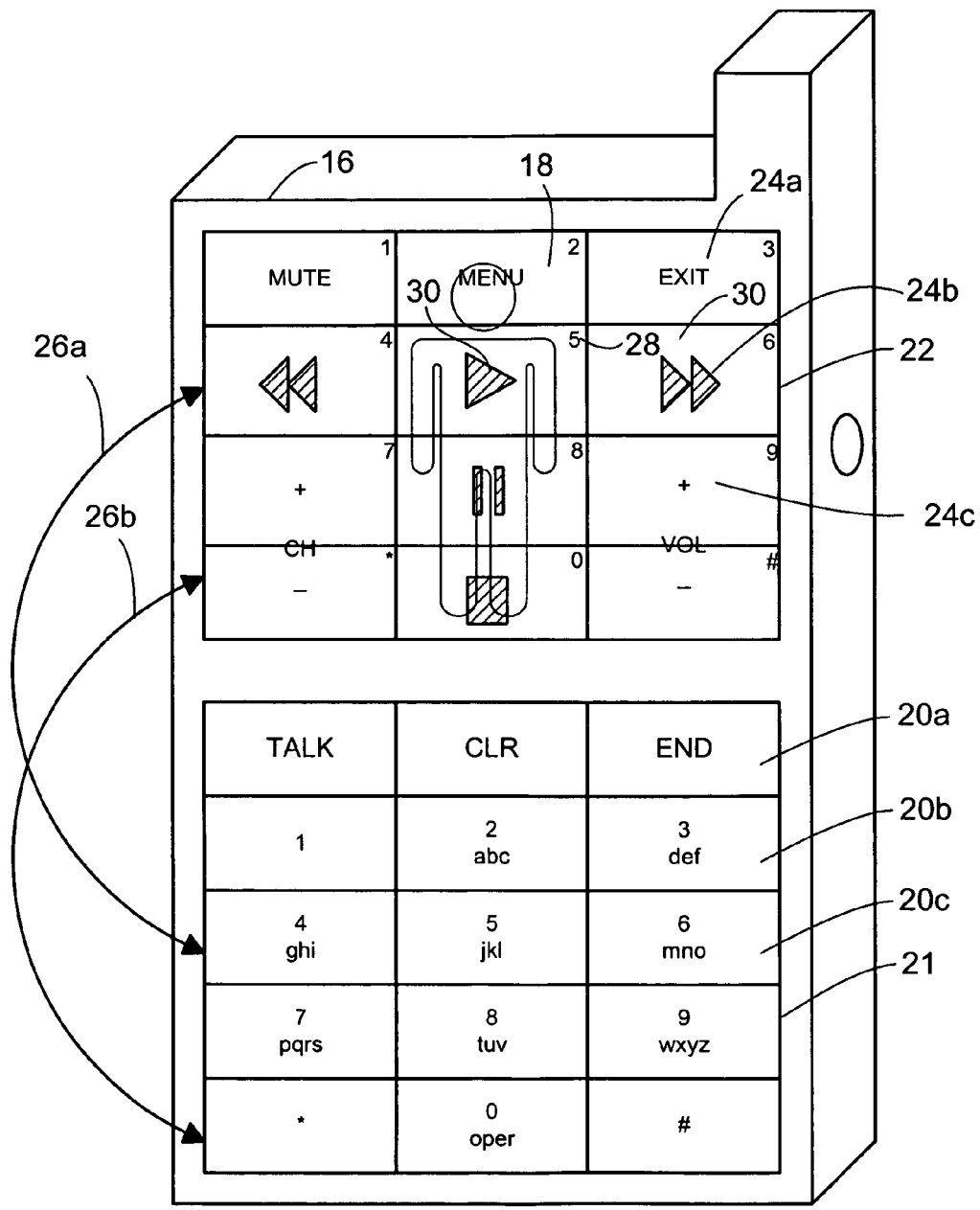

This description relates to television interfacing.

A television typically has an excellent user interface device to control its functions: the remote control. The remote control is crafted specifically for the television application, is well-labeled, and is large enough to contain lots of buttons, one for every conceivable purpose and then some.

On the other hand, a mobile device (e.g. a phone, a personal digital assistant (PDA), portable gaming device), being smaller and designed for a different purpose, provides a different kind of manual user interface, such as a bell keypad, a stylus and a four-way pointer, or possibly nothing (e.g., if commands are voice activated; see, for example, www.agiletv.tv)

Television may be broadcast to a mobile device, e.g., using digital multimedia broadcasting (DMB), digital video broadcasting: handhelds (DVB-H), and cellular streaming such as MobiTV or Cingular TV).

SUMMARY

In general, in an aspect, on a wireless handheld device that has a display and keys, an interface is provided that enables a user to control aspects of presentation of video material on a display of the handheld device, the interface including presentation of the display of visible tokens that are associated with respective keys.

Implementations may include one or more of the following features. The displayed visible tokens have respective positions that are associated with respective positions of the keys. The visible tokens comprise images of keys. The visible tokens may be displayed superimposed (or overlaid) on video material being presented. The user is enabled to control appearance or non-appearance of one or more of the visible tokens or overlay groups of the tokens. The user is enabled to configure the visible tokens or the overlay groups. The visible tokens represent aspects of the presentation to be controlled. The aspects include video transport actions. The aspects include volume or channel controls. The video material is delivered from another location. The aspects of presentation of video material that are to be controlled include aspects that are effected at a head end from which the video material is being delivered. Information associated with an activated one of the keys is provided to a device for implementation of one of the aspects of the presentation.

The tokens are organized as one or more overlays that may be controlled in part on the basis of user selections and/or in part on the basis of a state of the device or a state of a head end from which the video material is delivered. The overlays are sometimes hidden. Each overlay is associated with a mapping of tokens to keys, and the mapping may be controlled in part by a head end from which the video material is delivered. The overlays may provide a video zoom function, a channel selection function and display of video material of multiple channels simultaneously, and/or interactive inputs by the user with respect to interactive video material. The user may toggle between two different overlays to have access to more functions than the number of keys on the device. These and other aspects may include other combinations of the aspects and features recited above as well as other aspects and features, and may be expressed as methods, apparatus, systems, program products, and in other forms.

Among the advantages of these aspects, features, and implementations are one or more of the following. The interface provides a simple, easy-to-use, controllable, adaptable, dynamic way for a viewer to control video that is being presented on a mobile or hand held device.

Other features and advantages will be apparent from the description and claims.

DESCRIPTION

FIGS. 1 and 3-13 are views of handheld wireless devices.
FIGS. 2A and 2B are block diagrams.

Figure 2A:
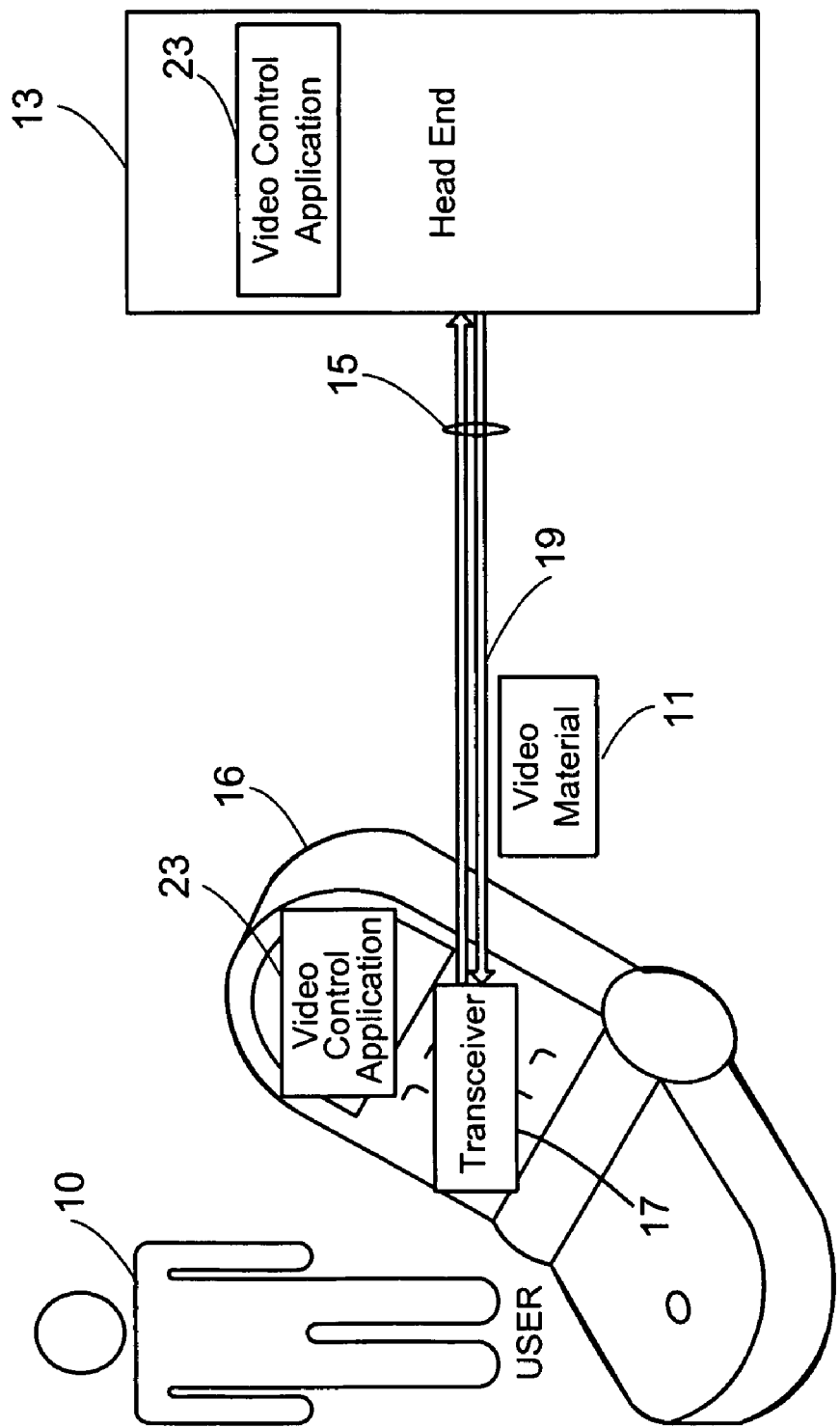
Figure 2B:
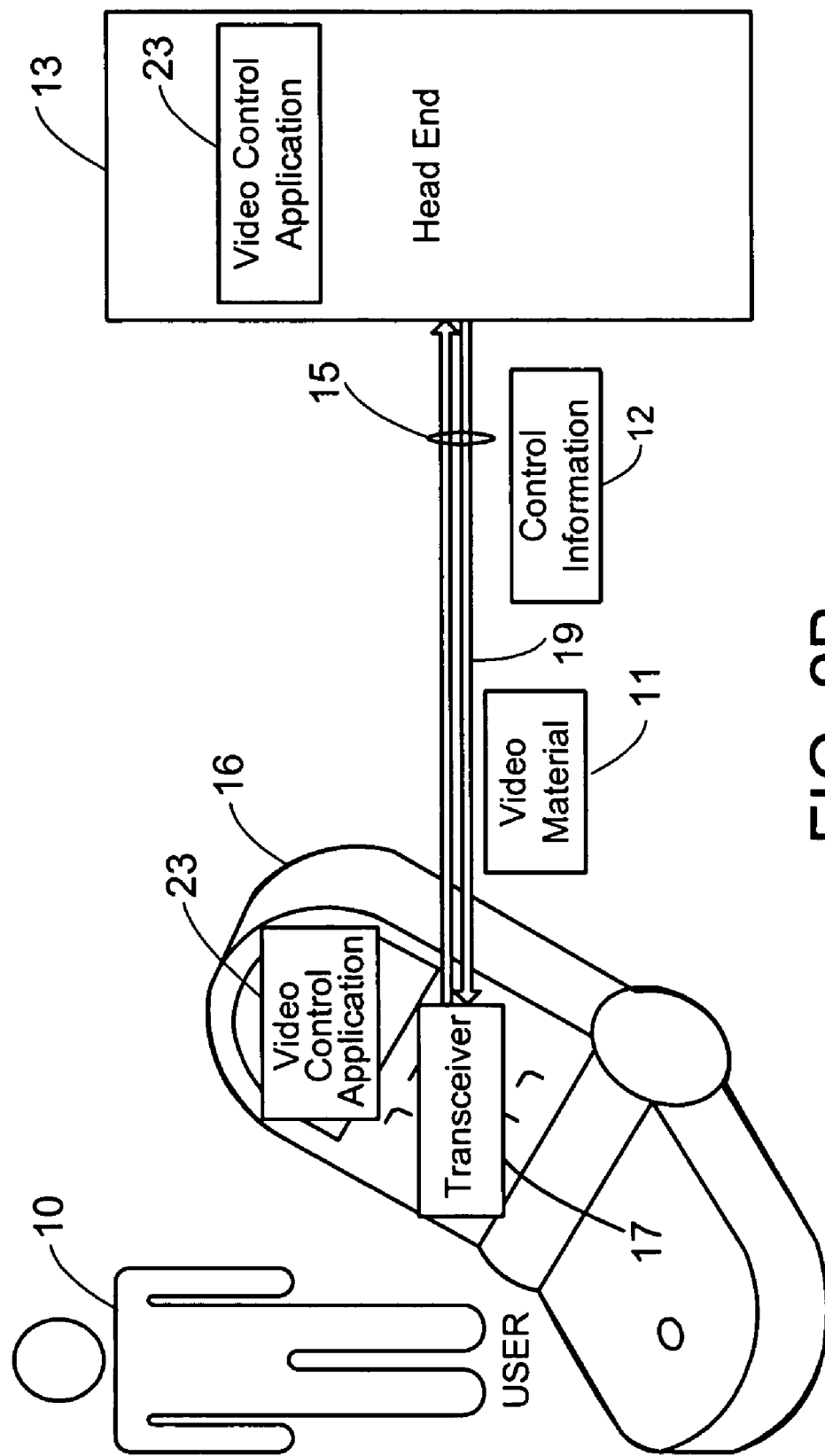

Referring to FIG. 1, when a user of a wireless handheld device 16 (here a cell phone) wishes to control aspects of a presentation of video material 18 that he is viewing, he can invoke a virtual remote control feature that enables keys 20a, 20b, . . . , on the keypad 21 of the phone to be used in much the same manner as the keys of a remote controller of a television set, by showing to the user on the phone's display 22 an overlay group of visible tokens 24a, 24b, . . . In the overlay, each token (a) has a position that is associated with a respective position of one of the keys (as indicated by arrows 26a, 26b, . . . ) of the keypad, (b) represents an aspect of the presentation to be controlled, and (b) may include graphical elements that symbolize that aspect of the presentation.

The overlay of tokens is superimposed on the video material in such a way that the video material remains at least partially visible to the user. This could be done by making the tokens partially transparent or by limiting the portion of each token that contains information. Although the tokens are shown as filling the entire area of the display, other sizes, shapes, and arrangements of tokens could be used.

Each of the tokens is embodied as graphical elements that may include an element 28 that corresponds to, matches, or is identical to at least one of the graphical elements that is displayed on the associated key (for example, the number "5") and may also include a graphical element 30 that represents an aspect of presentation of the video material to be controlled. For example, the element 30 could be a double right-hand arrow meaning "fast forward". The elements 30 of the various tokens can be conventional video playback elements (as shown on some of the visible tokens in FIG. 3). Other elements 30 can be words that describe actions to be taken, such as MUTE. Other elements could also be shown in the tokens, including images, icons, text, animations, or video.

By associating tokens with keys in his mind and by pressing a key that corresponds to a token that represents a desired action, the user can control the aspect of presentation of the video material that the token represents. For example, in FIG. 3, by pressing the "6" key, the user can cause the video to fast forward. In this way, the user can easily control aspects of presentation of the video material without confusion about which keys cause which action and without requiring navigation of menu lists displayed on the device. In effect, the device behaves much as a television remote or a digital video recorder (DVR) remote controller would, with comparable convenience to the user.

A wide variety of aspects of the presentation may be controlled by the user, including, to name only a few, volume up, volume down, channel up, channel down, play, pause, fast forward, rewind, stop, pause, info, menu, setup, and exit. A group of tokens that are displayed at one time may be called an overlay. A wide variety of different overlays could be available, each with its own tokens and mapping of tokens to keys. Overlays may be changed dynamically either as a result of user actions or by software running on the device or at the head end from which the video material may be delivered to the device. The choice of overlays to be displayed and the tokens to be displayed in a given overlay may be context sensitive, depending not only on actions of the user, but on the state of operation of the device or the head end or the nature of the video material being presented on the display. The selection of tokens for an overlay, the selection of overlays to be used, and the conditions under which overlays are to be presented may be fixed or dynamic and may be controlled by the user, by software running on the head end or the device, or by information provided the a source of the video material in the form of instructions or data carried with the video material, or in other ways. Referring to FIG. 2a, in some examples, the device 16 (which we also sometimes call a handset) can receive video material 11 that is broadcast from a head end 13 through a wireless network 15 using a standard or proprietary protocol.

The handset includes a transceiver 17 that can receive a wireless signal 19 that carries the video material and information associated with the video material, the overlays, the state of operation of the head end, program guides, and other aspects of the operation of the system. The handset also can send back to the head end commands and other information with respect to the video material, the overlays, the tokens, user preferences, and state of operation of the device, and other information related to the operation of the system. The commands can represent a user's decision to watch video material on the handset (instead of, say, using it as a telephone), a choice of which material to watch, and instructions concerning the playing of the video material, such as transport instructions. A video control application 23 running on the device or at the head end or at a combination of the two (through communication between parts of the application) could provide the various communication and control aspects of the system, including the interactive virtual remote feature that enables the user to easily control the video material.

The video material 23 need not be broadcast to the device (and other devices) but could be multicast or unicast or sent on demand to a single device. The channel through which the video material is sent can include wired portions in addition to (or in substitution for) wireless portions. The video material is received at the head end from a content provider that could be an owner or distributor of video material. The video material in digital form may be supplemented with metadata that is related to or useful for the operation of the virtual remote control feature including overlays and tokens, for example.

The video control application 23 could perform a limited range of functions or a wide variety of functions depending on the available storage and processing capacity. One function would be to maintain information about (a) a state of the presentation of the video material (for example, the state could be "cued but not playing" or "at the end and stopped" or "rewinding" or "playing"), (b) the virtual remote overlay currently being displayed to the user, other overlays that could be presented to the user, and the state of the active overlay (in terms of which tokens are included and visible at the moment, the mapping of keys to tokens, and the relationships of the active overlay to other overlays that could be presented), (c) sequences of keys, buttons, or switches that have been activated and other actions taken by the user, (d) a state of the virtual remote given that series of actions, and (e) a state of the head end with respect to the active video material, among other things.

The video control application interacts with the head end 13 to receive information about the state of the presentation of video material and to provide commands to cause changes in the presentation by the head end (for example, to rewind the material). The video control application also interacts with the device 16 to receive information about key presses and other actions of the user, the state of the device (is it on? is it being used as a telephone? is it ready to receive video?) and also to provide commands and information to the device. The commands could control the presentation of video material and the selection and presentation of the virtual remote overlay, for example. The information could include graphical elements of tokens and overlays, program guides, and detailed information about the format of video material, to name a few, There are a wide range of examples of the use of overlays, tokens within the overlays, allocation of buttons, keys, and switches to functions, and other aspects of the user interface effected by the virtual remote. We mention only a few here.

Often, when the device is being used as a phone or for other functions or when video material is being presented and viewed, the video remote overlay will not be displayed at all. The overlay can be invoked for display in a variety of ways. One of the keys, buttons, or switches can be dedicated permanently (or at a particular time or when the device is in a particular state) to cause the overlay to toggle between being displayed or not displayed. Or the video control application could determine when to display or not display the overlay based on a state of the head end or the device (for example, when a video item ends, the transport overlay could be displayed). If the user does not press any keys for a configurable predefined time period, the overlay may no longer be displayed, and the virtual remote may enter a standby state. In standby, the video control application is actively watching for activation of the dedicated overlay key.

Referring to FIG. 2b, in some examples, the device 16 can receive control information 12 from the head end 13. The head end 13 controls the mappings 26a, 26b, . . . , of the keys 20a, 20b, 20c, . . . , to the tokes 24a, 24b, . . . (FIG. 1). The control information 12 can contain key mapping information that is specific to the video material 11. For example, the control information 12 can contain instructions for the device 16 to map key "1" to the function "volume-down". The control information 12 can contain instructions for the device 16 to map a key for an interactive function (described later), such as mapping key "2" to the interactive function "buy this product". The control information 12 can provide instructions for the device 16 on how to respond to various user actions. For example, the information can instruct the device to "launch a web browser and navigate to URL www.company-.com/purchase".

The information can override the user's 10 preferences (described later) or the user 10 can set preferences to permit the control information 12 from the head-end to override, permanently or temporarily, the user's local preferences. The user 10 can configure the device 16 to not show this information, or to block (or flag) certain actions.

The control information 12 can be transmitted in any number of parts and in any order. For example, during the course of a video program transmission 11, different overlays (described later) are available for various portions of the program transmission 11. The different overlays may be transmitted in the control information. The control information for all or portions of the overlays can be transmitted together before transmitting the video material 11, along side the video material 11 as the media 11 is streamed, back-to-back with the video material 11, or when bandwidth permits. This variable transmission architecture permits implementation of quality of service for video transmissions.

Figure 4:
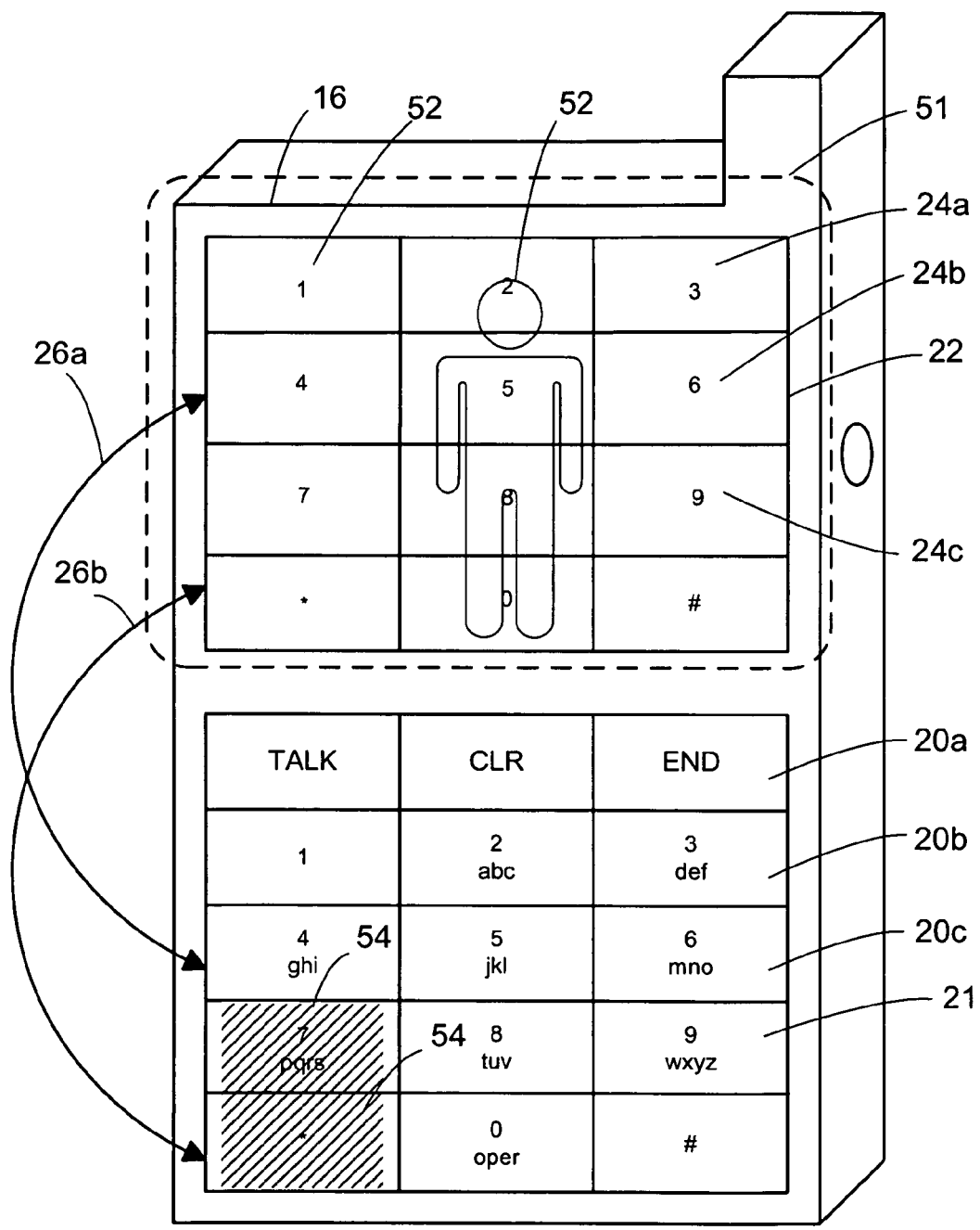

Referring to FIG. 4, pressing various hot key combinations can cause a switching among different overlay menus. Because the display may be small and the number of desired video control application functions may exceed the number of keypad keys, different visual overlays may be needed for different sets of functions.

Figure 3:
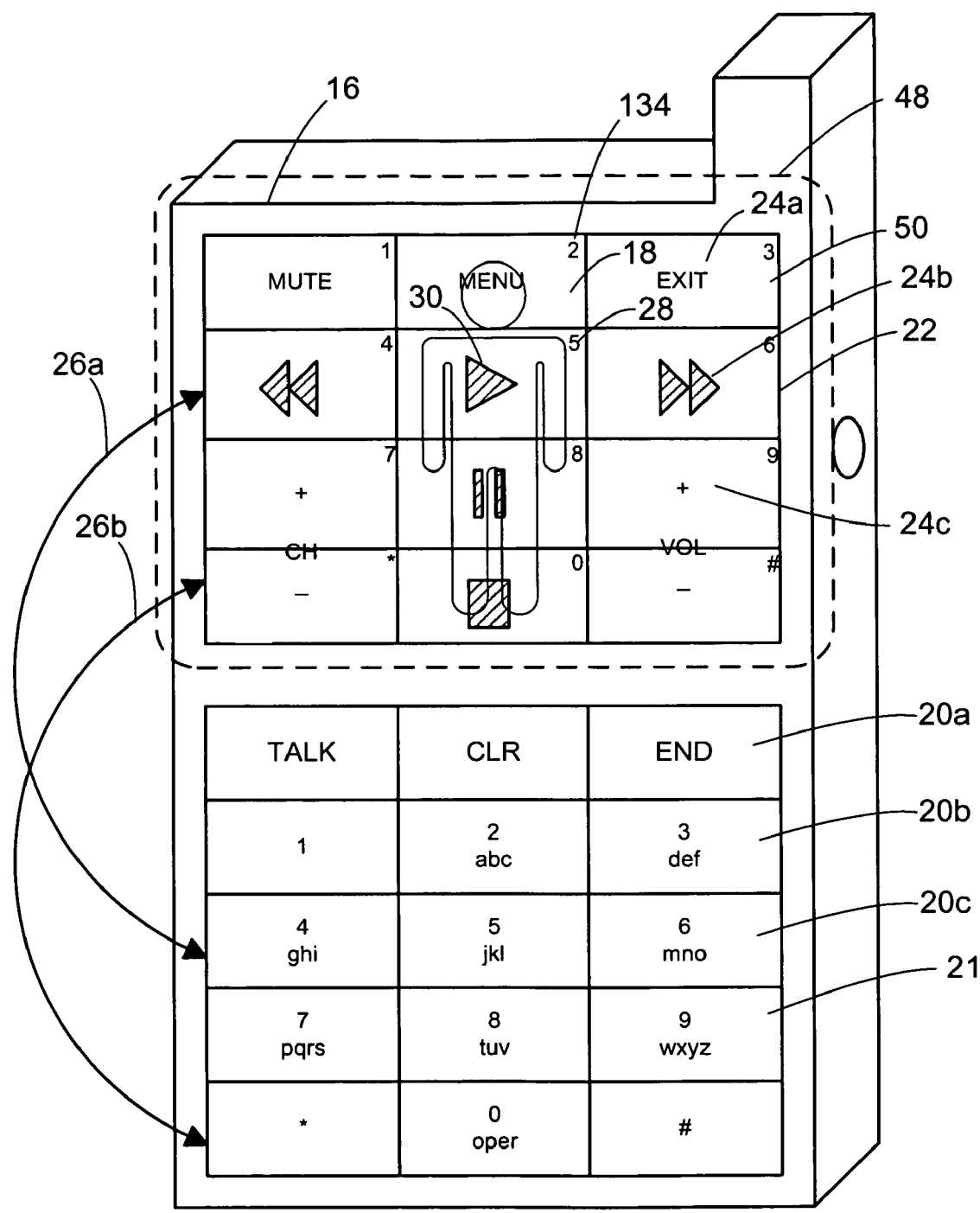

FIG. 3 shows a visual overlay 48 for DVR functions 50. FIG. 4 shows a visual overlay 51 for inputting channel numeric functions 52. If the user wishes to change the channel by inputting the channel number, simultaneously depressing the hot keys "7"+"*" 54 switches between the visual overlay 48 shown in FIG. 3 and the visual overlay 51 shown in FIG. 4. In that state, depressing an appropriate key on the numeric keypad causes a change of the channel. When the user inputs a new channel number, the video control application causes the head end to change to that channel. After the channel has been changed, the visual overlay 50 is closed and the device returns to a standby state. The remote may remain in standby until the user depresses the dedicated button again.

Figure 5:
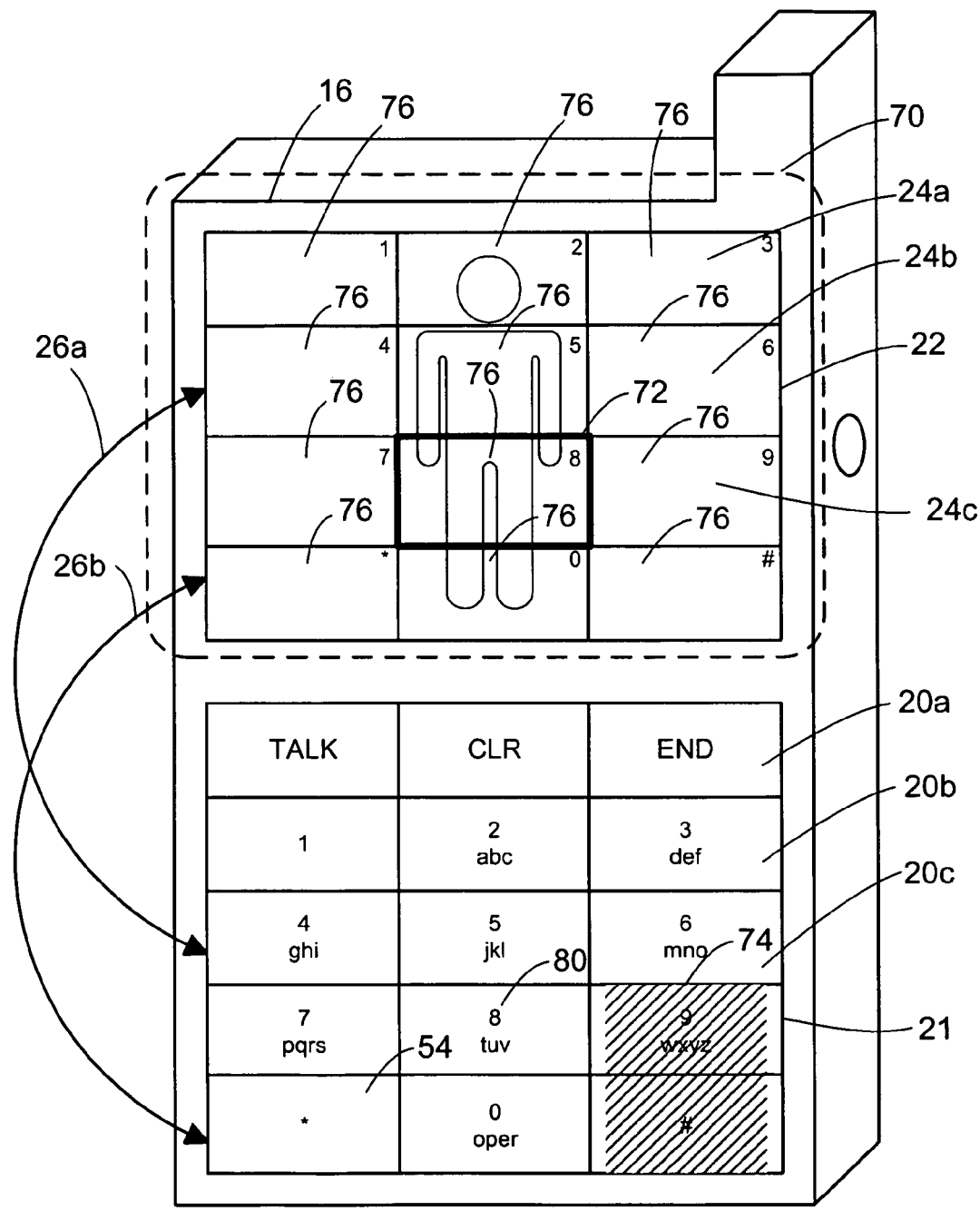

Referring to FIG. 5, another remote overlay 70 provides a zoom feature. If the user wishes to enlarge (zoom in) on a selected area 72 of the display, simultaneously depressing the hot keys "9"+"#" 74 causes the zoom feature to be displayed. The zoom feature divides the display into regions 76 each associated with a key on the keypad. Depressing the "8" key 80 zooms in on a region 78. In these examples, the display is divided into twelve zoom regions 76. If the user wishes to zoom further and if the head end can accommodate further zooming, depressing the hot keys "9"+"#" 74 brings up the zoom again and allows for further zooming. In some examples, the display may be divided into fewer zoom regions (e.g., 2, 3, 4, 6, etc.).

Figure 6:
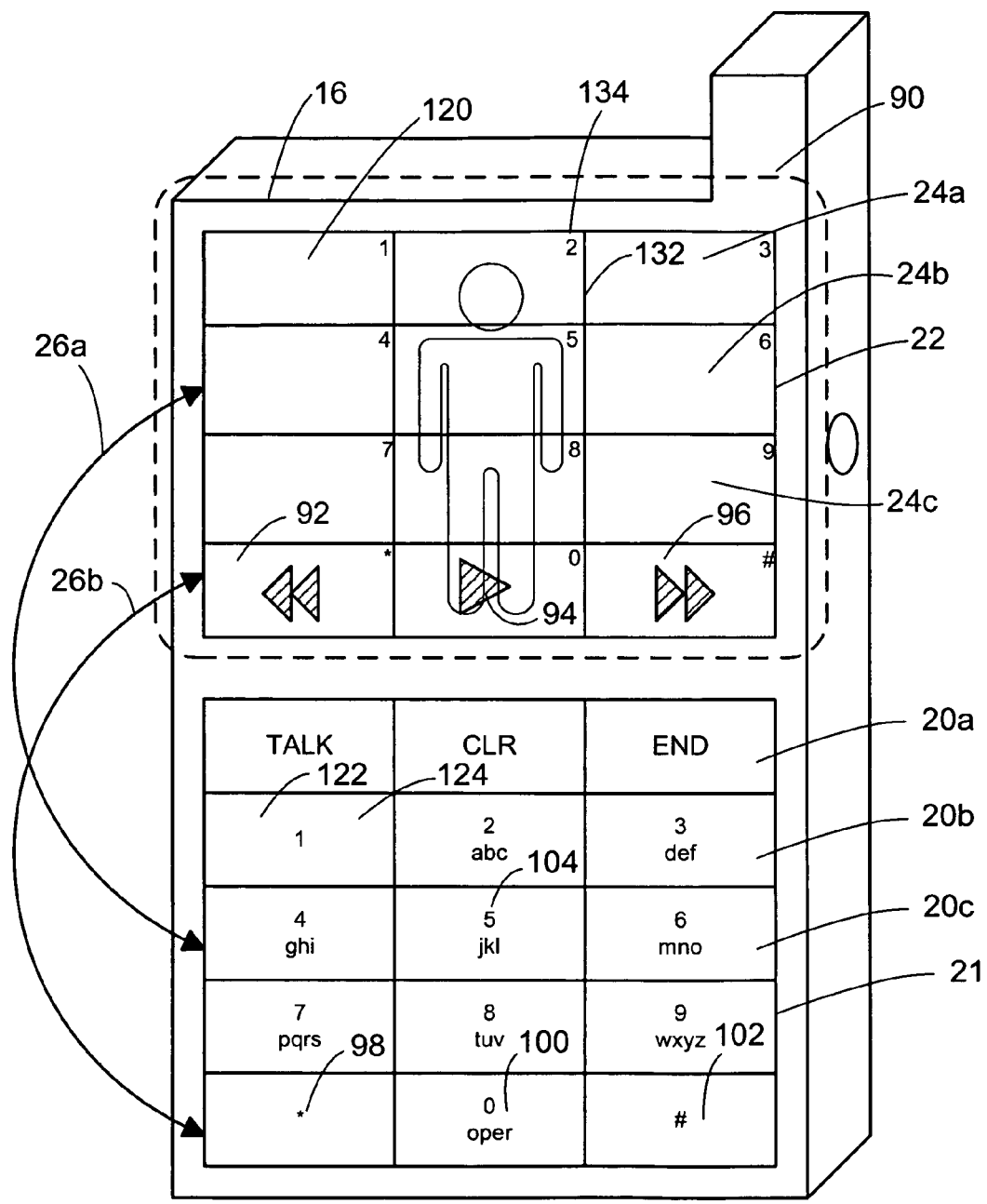

Referring to FIG. 6, as the user learns the mappings, the user can customize the overlays 90, for example, to display only some of the keys, for example, the keys for rewind 92, play 94, and fast forward 96. These three labels are mapped to the numeric keypad keys "*" 98, "0" 100, and "#" 102, respectively. Although the other functions (e.g. stop, pause) are not displayed (hidden), those functions can still remain active and accessible. For example, pressing the "5" key 104 pauses play even though the label is not displayed in the current overlay 90. The overlays may be customized with the labels for rewind 92, play 94, and fast forward 96 being mapped to different keys compared to the mapping shown in FIG. 2. The remaining functions may be hidden.

Some features can be turned off in the customization. For example, if the user has little use for a mute button 120 (mapped to the "1" key 122) as shown in FIG. 2, the user may turn off that function and use the key 124 for mapping to another function.

Figure 7:
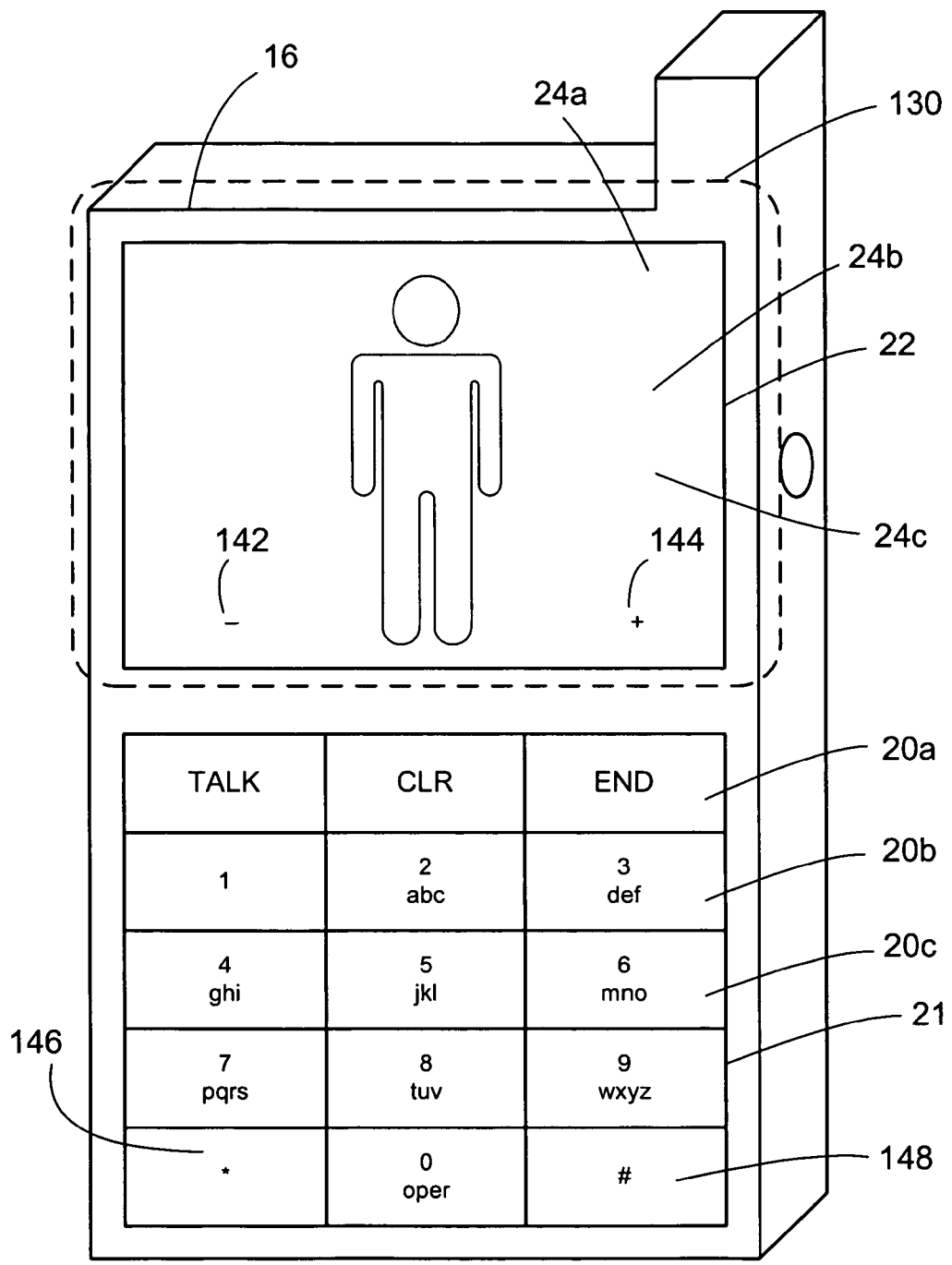

Referring to FIG. 7, the user may wish to customize the way a visual overlay 130 displays on the handset display. In this customization example, the user turned off the grid 132 (see FIG. 6) and the numeric keypad hints 134 (see FIG. 3) from the display. The "channel −" 142 and "channel +" 144 buttons are mapped to "*" 146 and "#" 148, respectively, but neither a grid 132 (see FIG. 6) nor numeric keypad hints 134 (see FIG. 3) are displayed.

Figure 8:
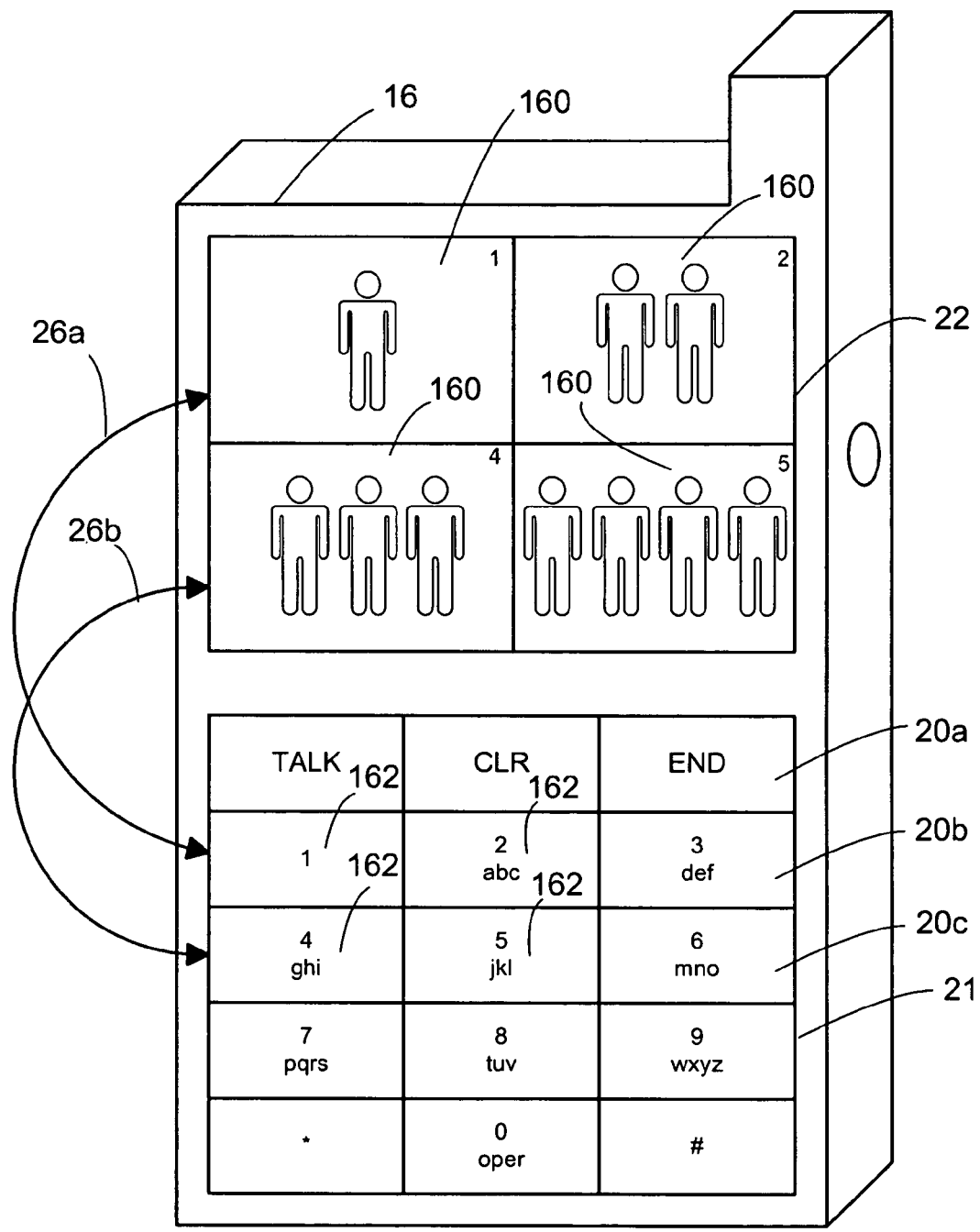

Referring to FIG. 8, a user watching multiple channel broadcasts simultaneously on the handset display can select among programs 160 using the virtual remote. In this scenario, four broadcast programs 160 are displayed simultaneously. Each broadcast program 160 is mapped to a specific key (e.g. 1, 2, 4, and 5). By pressing one of these mapped keys 162, the user selects and enlarges that program. The program is displayed on the entire handset display.

Figure 9A:
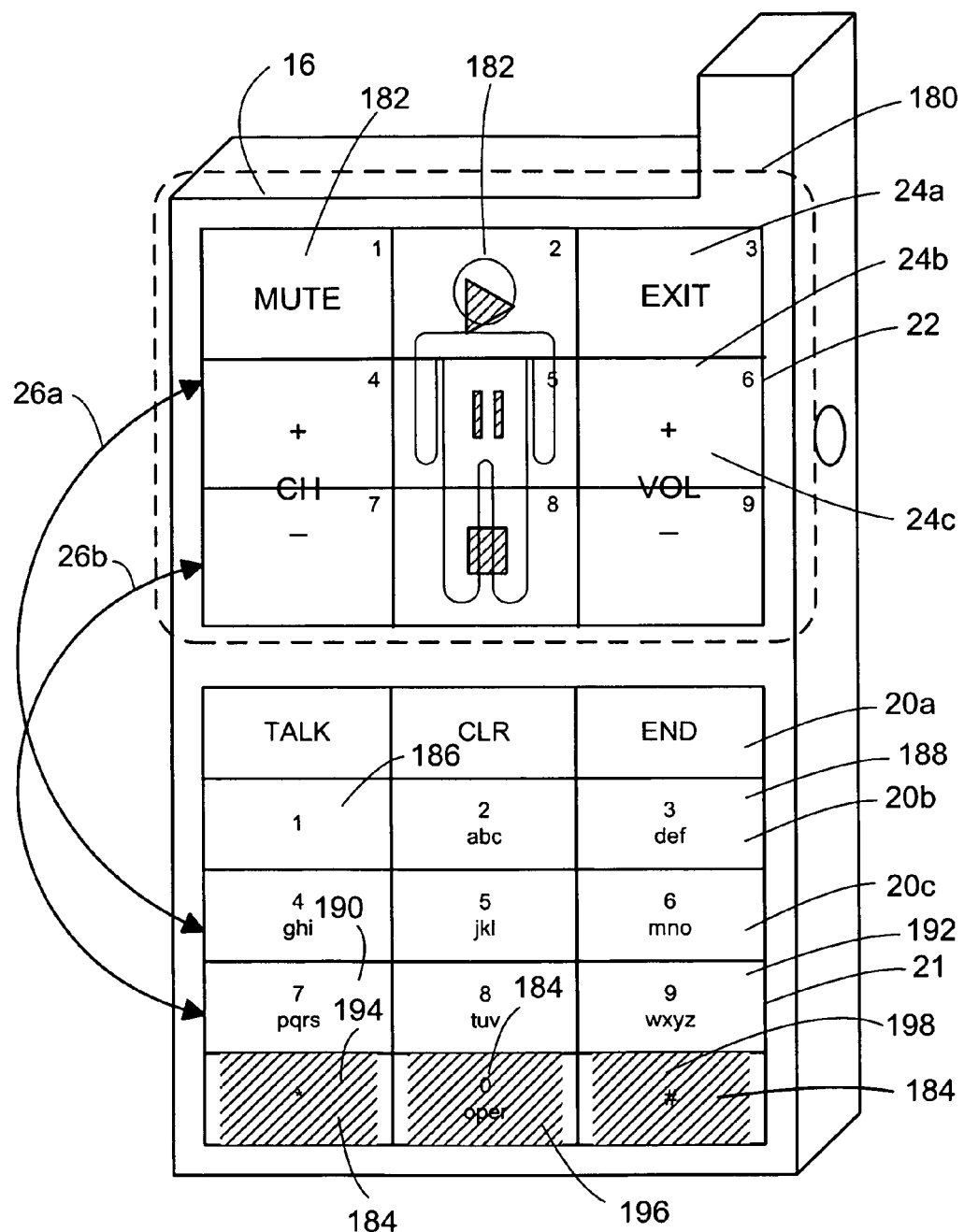

Referring to FIG. 9a, the user may wish to customize the visual overlay 180 by enlarging the labels 182 and eliminating keys 184 on the keypads from use. Here, the visual overlay uses nine keys for functions instead of twelve as shown in FIG. 1. This is useful for users 10 requiring larger display buttons larger spaces between the active keypad keys. For example, the user may customize the overlay to use only four keys, keys "1" 186, "3" 188, "7" 190, and "9" 192.

Additional functions can be accessed by switching to other overlays by depressing and holding toggle keys such as "*" 194, "0" 196, and "#" 198 (functioning much like "shift", "alt", and "ctrl" on computer keyboards).

Figure 9B:
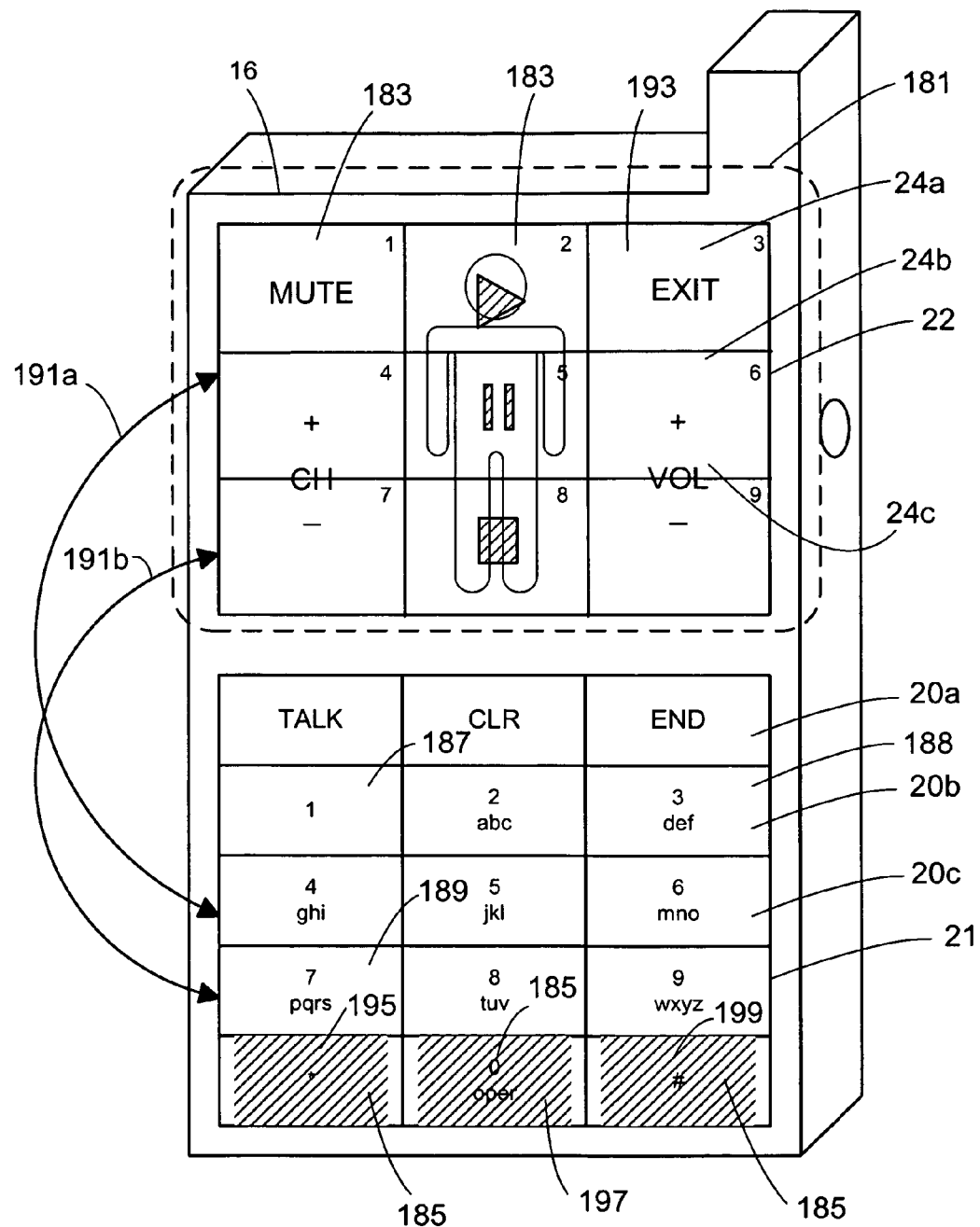

Referring to FIG. 9b, the additional overlays 181 can be accessed by depressing "sticky" toggle keys 185 (also secondary keys) such as "*" 195, "0" 197, and "#" 199. In other embodiments, other keys 187, 189, 191 can be assigned as "sticky" toggle keys. Referring to the current example, by depressing one or a combination of these "sticky" toggle keys 185, a different overlay 181 is displayed and a new set of key mappings 191a, 191b, . . . , is activated. For example, depressing "*" followed by "5" (denoted "*-5") can map to a different function than depressing "5" without prefixing with "*". In some embodiments, especially for frequently used or important functions, the user 10 may wish to map "*-5" to the same function as the un-prefixed "5".

In this example shown with twelve keypad keys, the "sticky" toggle keys 185 expand on the number of key mappings 191a, 191b, . . . Without any "sticky" key bindings, the keypad 21 can map the twelve key (0-9, *, and #) 20a, 20b, 20c, . . . , to at most twelve functions (not counting activation of other through a setup key). By binding the "*" as a "sticky" key, the keypad 21 has twenty-three possible key mappings 191a, 191b, . . . , instead of twelve. Further binding the "#" as a "sticky" key produces thirty-four possible key mappings 191a, 191b, . . .

The secondary keys 185 may be overflow key bindings where the first 193 did not have enough keys for the desired functions. The secondary keys 185 may be categorized or grouped into themed bindings. For example, the "#" key 199 may open the overlay for the set of keys related to interactivity or voting (discussed later) and the "*" key 195 may open the overlay for the set of keys related to Personal Video Recorder (PVR) or "trick play".

Because these key mappings are programmable, the user may organize the functions hierarchically to perform themed bindings or personal preferences such as frequently used functions. These keys may be further bound based on the programming material being presented. A streaming music presentation may initiate one set of hierarchical bindings (not shown), while streaming video presentation may initiate a second set of hierarchical bindings 191a, 191b, . . .

In some embodiments, the binding and hierarchy is "trained" by the software. By using the application 23 over time, the user 10 trains the application 23 on the user's preferences and an overlay that best suits the user's preferences is presented. The user may use this trained overlay as is or the user may use this as a template for settings preferences.

Figure 10:
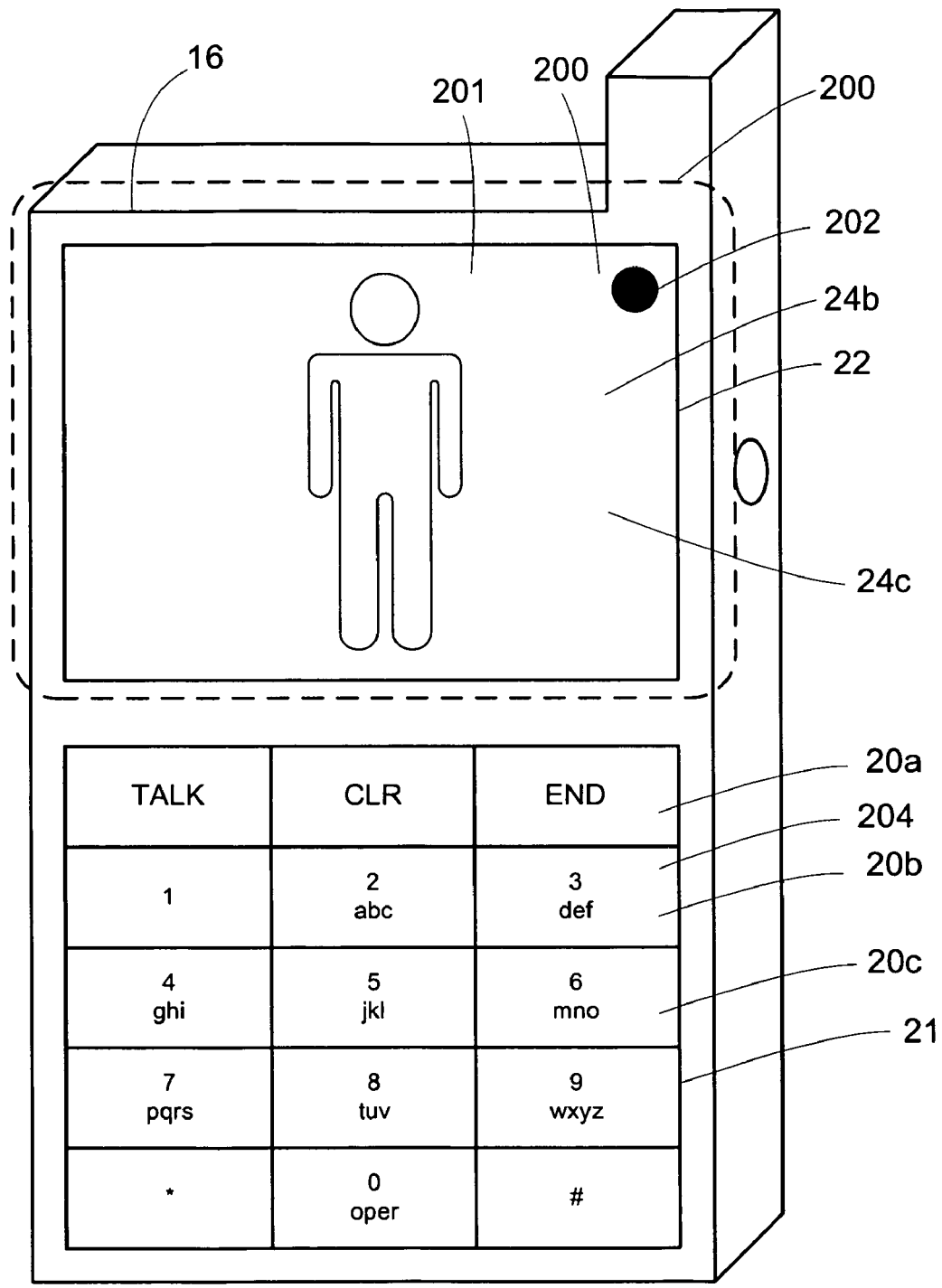

Referring to FIG. 10, the virtual remote maps the key in a context-specific fashion. Some television programs 200 are interactive. When the television signal 200 contains an embedded interactive element 201 (not shown), the presence of interactive elements is indicated by a signal 202, such as a blue dot 202 in the upper right hand corner of the display. Without the need to actively awaken the video control application from its standby state, the user may depress an associated interactive element key (here, "3" key 204) to engage the interactive element 201. The key 204 launches a superimposed overlay 220 (see FIG. 11) of interactive options such as vote, Short Message Service (SMS), shop, surf, buy, etc.

Figure 11:
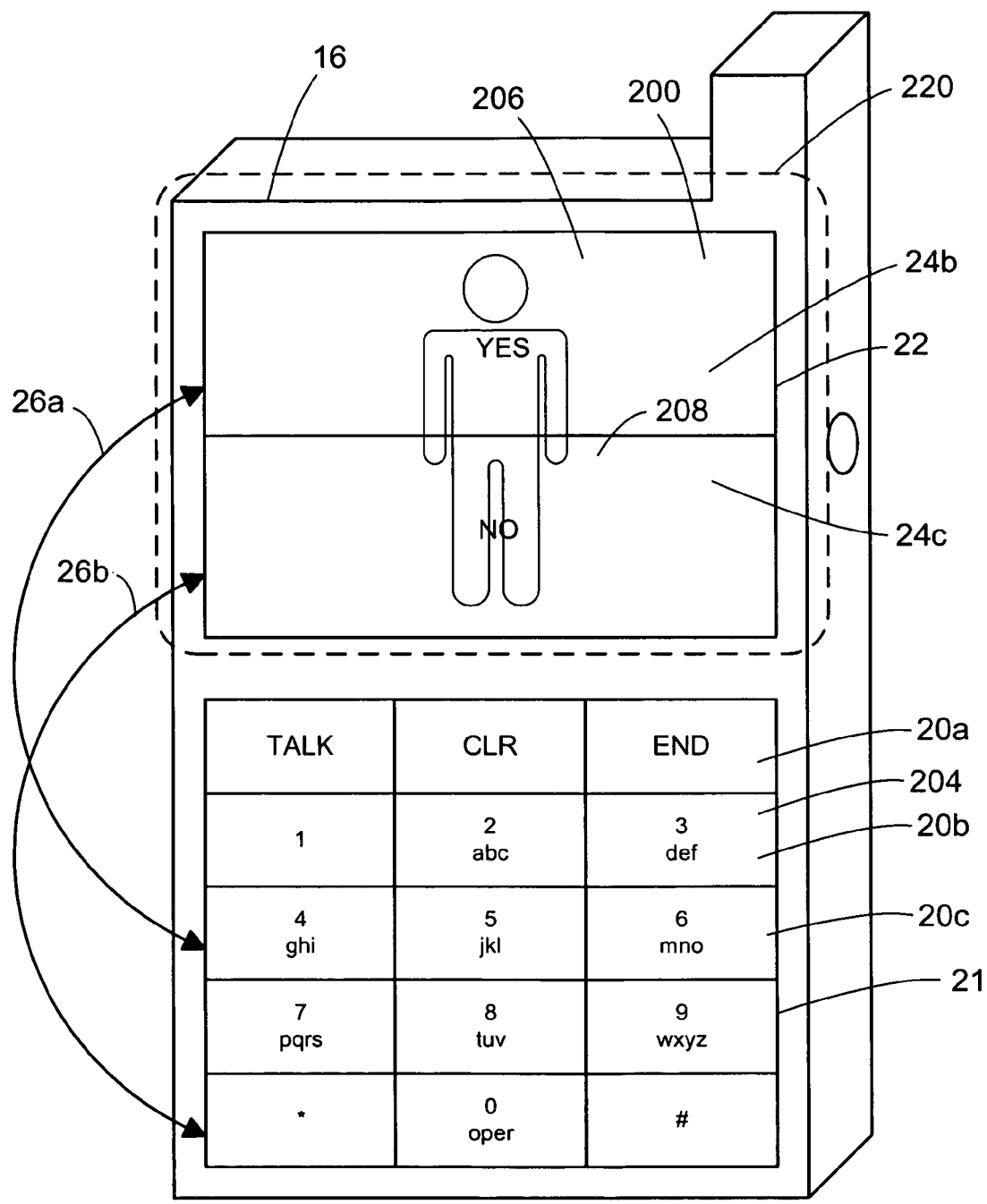

Referring to FIG. 11, a vote 220 is displayed after depressing the associated interactive-element key 204. The user 10 may then vote "Yes" 206 or "No" 208, and the information is sent to the wireless network 15 to an appropriate server (not shown).

Figure 12:
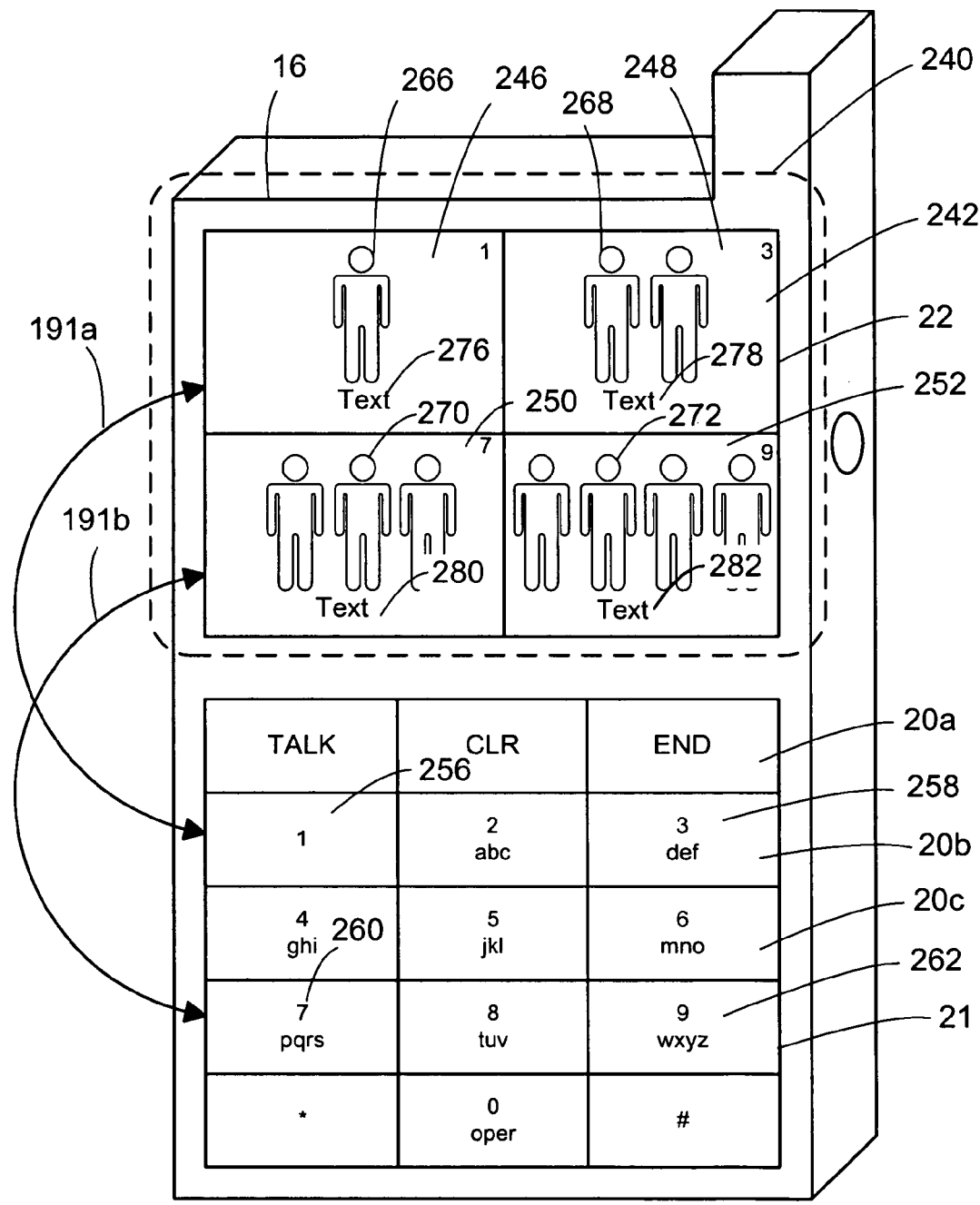

Referring to FIG. 12, a vote 242 overlay 240 is displayed as a part of the broadcast. The vote 242 is displayed without requiring the user 10 to depress an associated interactive-element key (not shown). The user 10 may then vote by depressing a key 256, 258, 260, 262 associated with one of a number of corresponding options 246, 248, 250, 252.

In some embodiments, an associated graphical token 266, 268, 270, 272 is displayed within the options 246, 248, 250, 252. The graphical token 266, 268, 270, 272 suggests to the user 10 what is being selected by depressing the associate keypad 21 key 256, 258, 260, 262.

In some embodiments, an associated non-graphical token 276, 278, 280, 282 is displayed within the options 246, 248, 250, 252. The non-graphical tokens 276, 278, 280, 282 can name and/or describe the associated option 246, 248, 250, 252.

In some embodiments, a combination of graphical 266, 268, 270, 272 and non-graphical tokens 276, 278, 280, 282 are displayed within the options 246, 248, 250, 252.

In some embodiments, the selection is associated with items for purchase and making selecting from the 242 is associated with making a purchase of the displayed item 266, 268, 270, 272.

Figure 13:
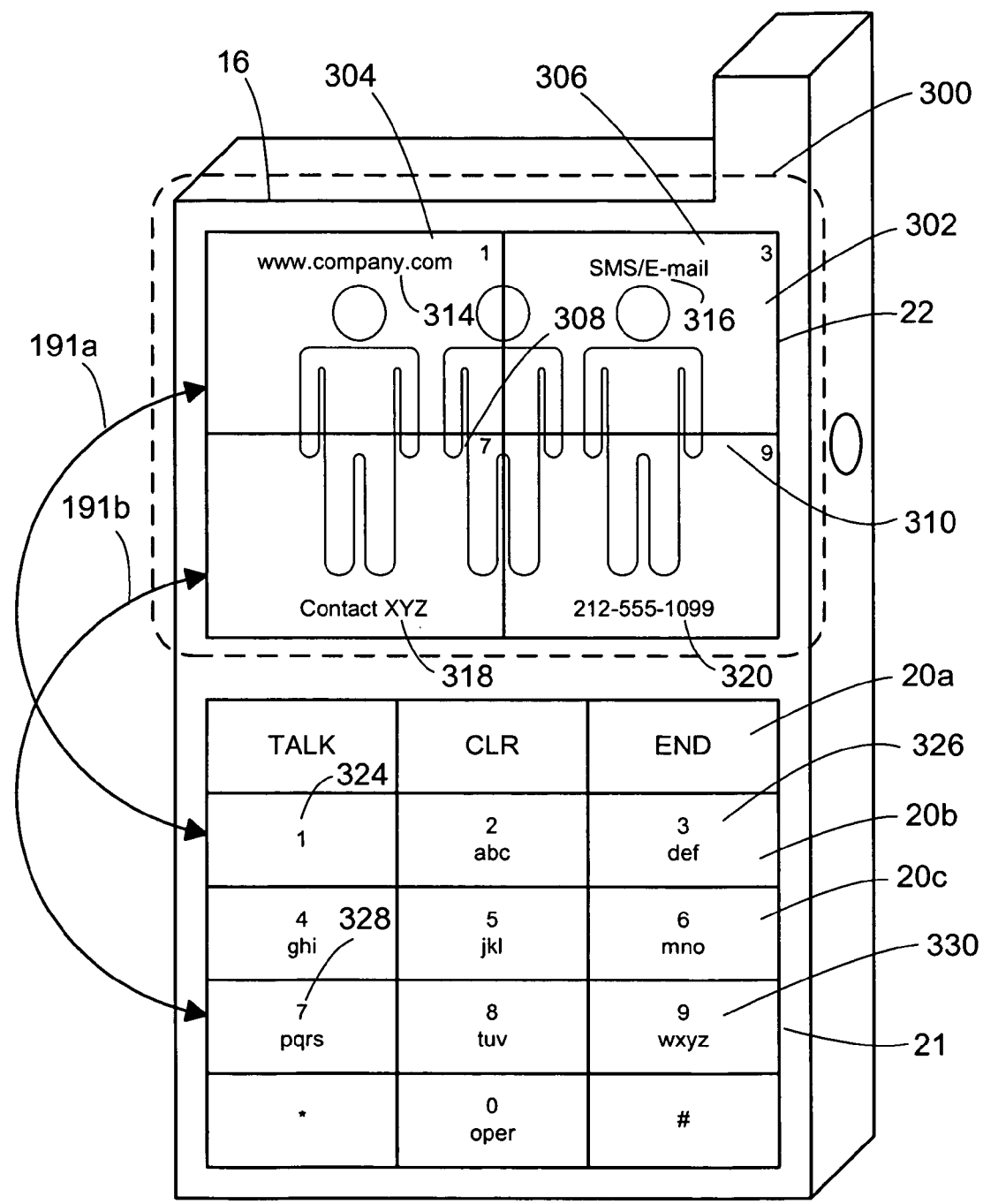

Referring to FIG. 13, in some embodiments, the user 10 may interaction with the content 302 in a contact or information discovery capacity. Information associated with further services 314, 316, 318, 320 may be transmitted with the broadcast program or service 302. In the overlay 300, the user 10 may access these services 314, 316, 318, 320 by selecting the associated item 304, 306, 308, 310.

To illustrate with an example, if the broadcasted program or service 302 is a commercial, information about the company (or product) such as a company URL 314, a company telephone number 320, a company Short Message Service (SMS) or e-mail contact information 316, or any other means of contacting 318, finding information on, or interacting with the company may be access by depressing the associated key 324, 326, 328, 330 on the keypad 21.

If the user 10 wishes to access the displayed hyperlink 314 ("click to web"), the user would depress the keypad 21 key 324 associated with that option 304. Similarly, if the user wishes to call the displayed telephone number 320 ("click to call") or send an SMS/E-mail 316 message ("click to SMS"), the user would only need to depressed the associated keypad 21 key 330, 326. This frees the user from needing to record or to dial an entire telephone number to contact the company. Other embodiments may include other contact means, including voice mailing, sending photo emails, Internet Relay Chat (IRC), and push-to-talk.

In another scenario of context-specific mapping, if the application is playing a live television broadcast, the virtual remote keypads may show a "trick play" key: FF, REW, PAUSE, REC, ESC because those are functions that make sense in the context of a live broadcast.

Other embodiments are within the scope of the following claims.

What is claimed is:

1. A method comprising
on a mobile telephone that has a numeric-style pad of keys used to dial telephone numbers and a display on which a video item can be presented to the user of the mobile telephone, and that receives a video item at the mobile telephone wirelessly from a head end video source at a location other than the location at which the mobile telephone is being used,
presenting the video item on the display of the mobile telephone that has the numeric-style pad of keys, and simultaneously presenting, overlaid on the video item that is being displayed on the display of the mobile telephone that has the numeric-style pad of keys, visible tokens, in relative positions corresponding to relative positions of keys of the numeric-style pad, that are indicative of fast forward and rewind of the video item,
when the user activates the key on the pad of keys that has a relative position corresponding to the relative position of the token that is indicative of fast forward, the fast forwarding of the video is done at the head end from which the video item is being delivered, and when the user activates the key on the pad of keys that has a relative position corresponding to the relative position of the token that is indicative of rewind, the rewinding of the video item is done at the head end from which the video item is being delivered.

2. The method of claim 1 in which the visible tokens comprise images of keys.

3. The method of claim 1 including enabling the user to control appearance or non-appearance of the visible token.

4. The method of claim 1 including enabling the user to configure the visible token.

5. The method of claim 1 also including providing information associated with an activation of one of the keys to a device for implementation of transport action.

6. The method of claim 1 in which the overlay is controlled in part on the basis of a user selection.

7. The method of claim 1 in which the overlay is controlled in part on the basis of a state of the head end from which the video material is delivered.

8. The method of claim 1 in which the overlay is sometimes hidden.

9. The method of claim 1 in which the overlay is associated with a mapping of tokens to keys.

10. The method of claim 9 in which the correspondence of keys is controlled in part by the head end from which the video material is delivered.

11. The method of claim 1 in which the overlay includes a visible token corresponding to a video zoom function.

12. The method of claim 1 in which the overlay includes visible tokens corresponding to a channel selection function and display of video items of multiple channels simultaneously.

13. The method of claim 1 also including enabling a user to toggle between two different overlays to have access to more functions than the number of keys on the device.

14. The method of claim 1 in which the overlay enables interactive inputs by a user with respect to interactive video material.

15. The method of claim 1 in which the visible token represents play, fast forward, rewind, stop, or pause.

16. A medium that bears instructions to cause a wireless handheld device that has a display and control keys, to provide an interface that enables a user to control video transport actions for video material, delivered from a head end at another location, on the handheld device, the video material being received wirelessly in real time at the handheld device, the interface including display of visible tokens that are associated with respective control keys, the video transport actions being effected at the head end from which the video material is delivered, the visible tokens being organized as overlays each associated with a mapping of tokens to keys, the visible tokens including a token indicative of fast forward of the video item.

17. The medium of claim 16 in which the visible tokens comprise images of keys.

18. The medium of claim 16 including enabling the user to control appearance or non-appearance of the visible tokens.

19. The medium of claim 16 including enabling the user to configure the visible tokens.

20. The medium of claim 16 in which the overlays are controlled in part on the basis of a user selection.

21. The medium of claim 16 in which the overlays are controlled in part on the basis of a state of the head end.

22. The medium of claim 16 in which the overlays are sometimes hidden.

23. The medium of claim 16 in which the overlays are associated with a mapping of tokens to keys.

24. The medium of claim 23 in which the correspondence of keys is controlled in part by the head end.

25. The medium of claim 16 in which the overlays include a visible token corresponding to a video zoom function.

26. The medium of claim 16 in which the overlays include visible tokens corresponding to a channel selection function and display of video items of multiple channels simultaneously.

27. The medium of claim 16 also including enabling a user to toggle between two different overlays to have access to more functions than the number of keys on the device.

28. The medium of claim 16 in which the overlays enable interactive inputs by a user with respect to interactive video material.

29. A handheld device comprising:
a display and a keyboard and storage holding instructions to cause the device to provide an interface that enables a user to control aspects of presentation of a video item received wirelessly in real time from a head end at another location, on a display of the handheld device, the video item including video elements that occur in a predetermined sequence corresponding to a chronological sequence of moments in time,
the interface including presentation on the display of visible tokens that are associated with respective control keys that are to be used in the control of transport actions that cause the display to change from one of the video elements of the video item, corresponding to one of the moments of time in the chronological sequence of the video item, to another of the moments in time in the chronological sequence of the video item, the visible tokens including a token indicative of fast forward of the video item,
the visible tokens being organized as overlays each associated with a mapping of tokens to keys,
the transport actions being effected at the head end, at the other location, from which the video item is being received wirelessly in real time.

30. The device of claim 29 in which the visible tokens comprise images of keys.

31. The device of claim 29 including enabling the user to control appearance or non-appearance of the visible tokens.

32. The device of claim 29 including enabling the user to configure the visible tokens.

33. The device of claim 29 in which the overlays are controlled in part on the basis of a user selection.

34. The device of claim 29 in which the overlays are controlled in part on the basis of a state of the head end.

35. The device of claim 29 in which the overlays are sometimes hidden.

36. The device of claim 29 in which the correspondence of tokens to keys in the mapping is controlled in part by the head end.

37. The device of claim 36 in which the overlays include a visible token corresponding to a video zoom function.

38. The device of claim 29 in which the overlays include visible tokens corresponding to a channel selection function and display of video items of multiple channels simultaneously.

39. The device of claim 29 also including enabling a user to toggle between two different overlays to have access to more functions than the number of keys on the device.

40. The device of claim 29 in which the overlays enable interactive inputs by a user with respect to interactive video material.

41. A method comprising
enabling a user to invoke playing, fast forwarding, rewinding, stopping, and pausing of a video item being presented, wirelessly in real time from a head end at another location, on a display of the handheld device, by pressing keys of a numeric telephone style keypad that correspond to transport tokens overlaid visibly on the video item, the fast forwarding, rewinding, stopping, and pausing being executed at the head end,
the correspondence of keys to tokens being controlled in part from the head end on the basis of a state of the head end.

42. The method of claim 41 in which the visible tokens comprise images of keys.

43. The method of claim 41 including enabling the user to control appearance or non-appearance of the visible tokens.

44. The method of claim 41 including enabling the user to configure the visible tokens.

45. The method of claim 41 including a visible token corresponding to a video zoom function.

46. The method of claim 41 in which the overlays include visible tokens corresponding to a channel selection function and display of video items of multiple channels simultaneously.

* * * * *